United States Patent [19]

Diener

[11] Patent Number: 4,541,644
[45] Date of Patent: Sep. 17, 1985

[54] MANUAL UTILITY CART

[76] Inventor: Henry Diener, 71121 U.S. 131, White Pigeon, Mich. 49099

[21] Appl. No.: 476,035

[22] Filed: Mar. 17, 1983

[51] Int. Cl.$^4$ .......................... B62D 1/10; B62D 61/12
[52] U.S. Cl. .................................. 280/43.1; 280/47.2; 280/5.28
[58] Field of Search .................. 280/43.11, 43.1, 47.2, 280/47.21, 47.27, 80 A, 5.28

[56] References Cited

U.S. PATENT DOCUMENTS

| | | | |
|---|---|---|---|
| 2,616,720 | 11/1952 | Knoth | 280/43.1 |
| 2,925,283 | 2/1960 | Stilger | 280/43.1 |
| 3,499,658 | 3/1970 | Fernholz et al. | 280/47.2 |
| 3,677,573 | 7/1972 | Chin | 280/43.1 |

Primary Examiner—Richard A. Bertsch
Attorney, Agent, or Firm—Eugene C. Knoblock

[57] ABSTRACT

A manual utility cart including a frame having spaced cargo retaining portions and a lower portion. An axle journaled in the lower portion of said frame journals a first set of wheels. A second set of wheels is journaled on an axle spaced from and supported by said first axle and is shiftable about the first axle between a retracted position and a frame supporting position to raise the first set of wheels from a surface. A cover overlies both sets of wheels to support a cargo within the frame.

6 Claims, 7 Drawing Figures

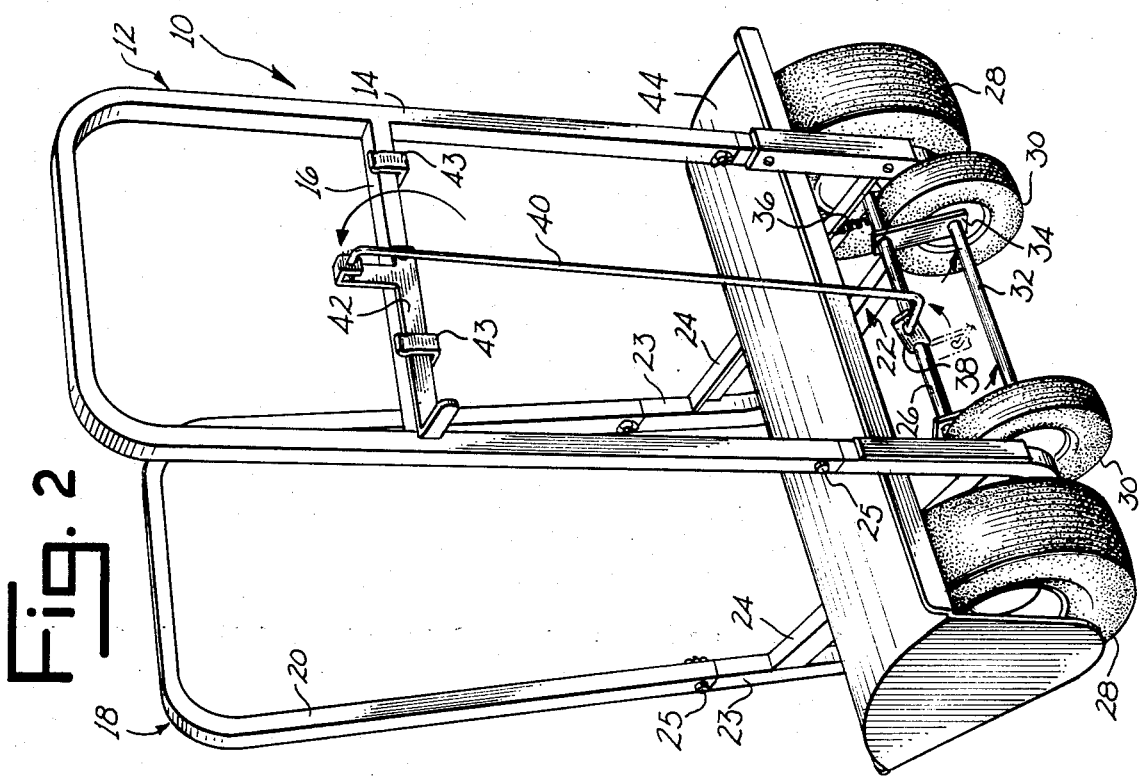
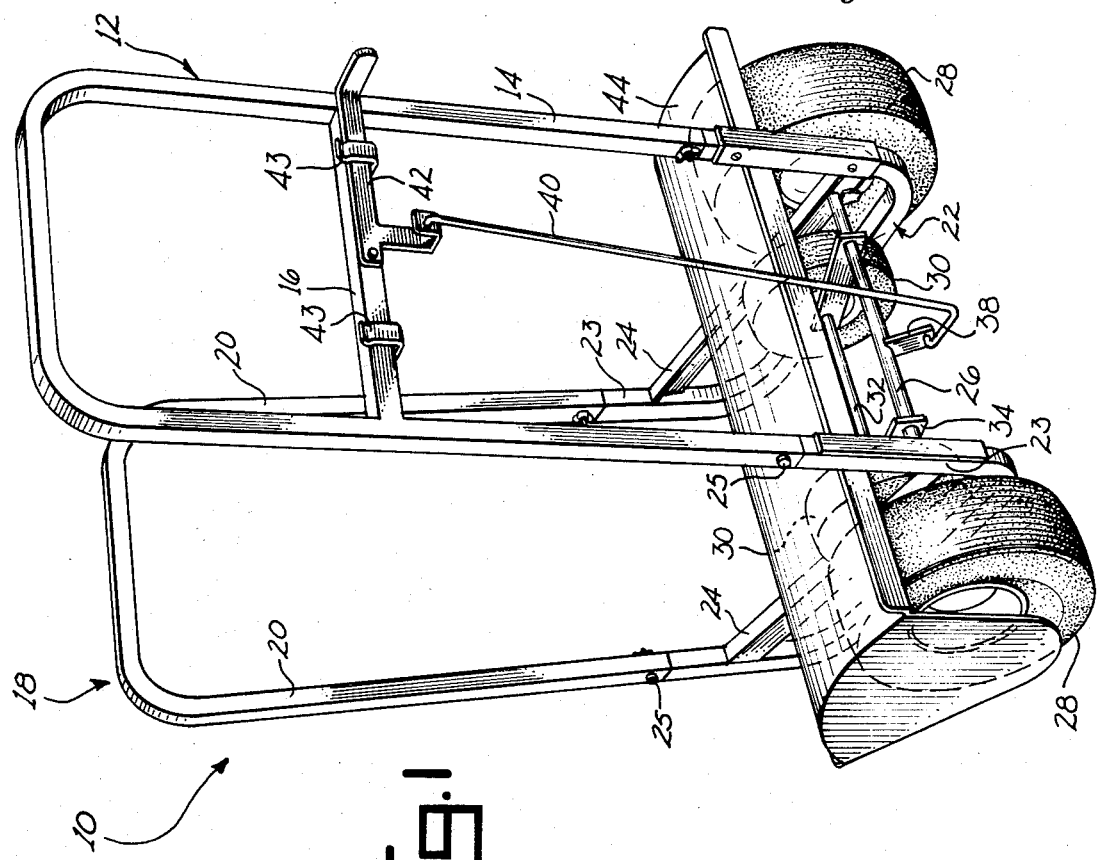

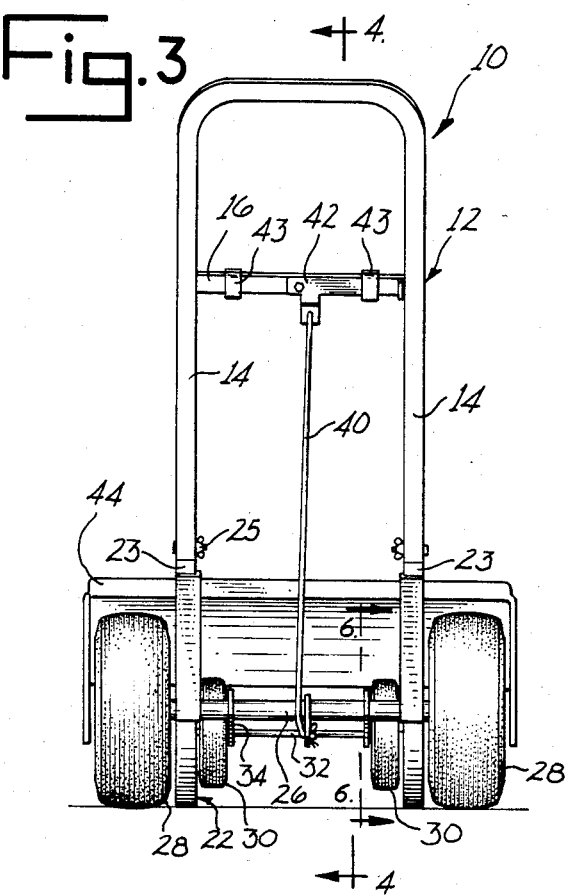
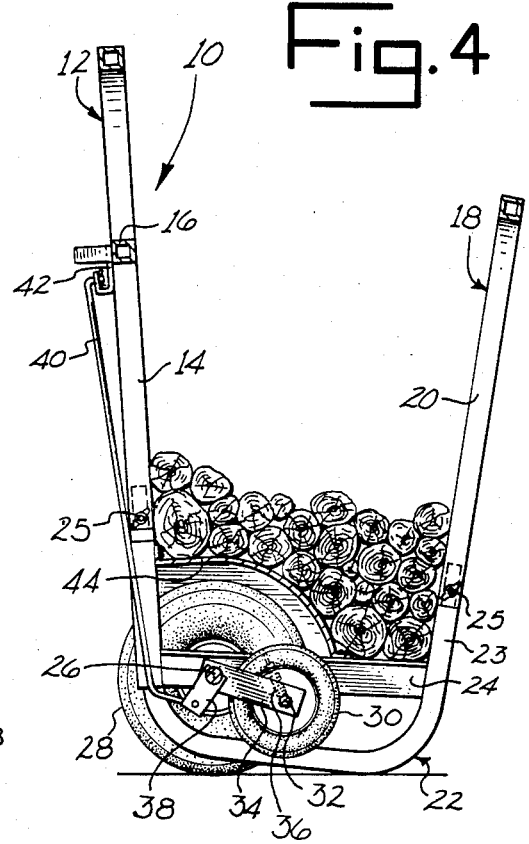
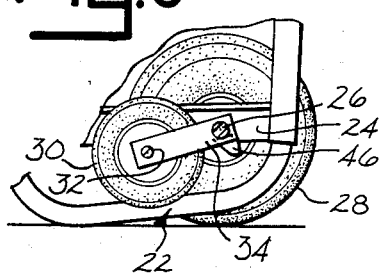
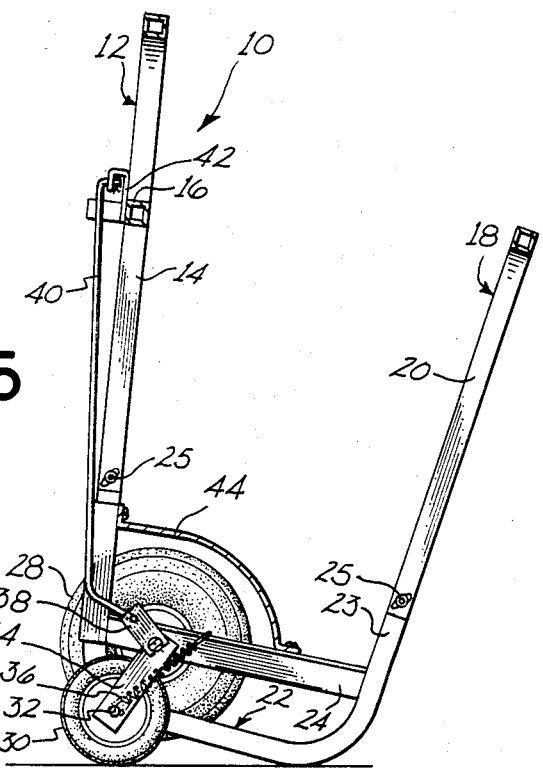
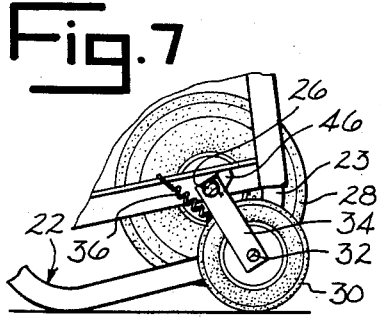

MANUAL UTILITY CART

SUMMARY OF THE INVENTION

This invention relates to a manual utility cart.

The present state of the art in utility carts includes carts having only a single set of wheels for support of the cart on all terrain and surfaces traversed thereby. In certain uses of a cart, such as transport of materials from out of doors to the indoors, this is not desirable since mud, snow, and other elements collect on the wheels and will be tracked into a building as the cart moves into the building.

This invention solves this problem by providing a cart having a dual set of wheels with one set of wheels shiftable between a raised or retracted position relative to a second set of wheels and a lowered, supporting position relative to said second set of wheels. The cart includes a pair of spaced upright frame portions joined at their lower ends by cross-members. An axle is journaled by the frame cross-members and journals a pair of wheels at its ends. Auxiliary wheels are journaled at the ends of a pair of arms which project from the axle. Rotative movement of the axle shifts the auxiliary wheels between a raised or elevated retracted position and a lower cart-supporting position in response to movement of a positioning lever. A cover overlies the wheels between the upright frame portions to support a cargo that has been placed in the cart.

Accordingly, it is an object of this invention to provide a novel and useful manual utility cart of simple and inexpensive construction which has a wide range of usefulness.

Another object is to provide a manual utility cart which will not track dirt and moisture into a building when advanced from the outdoors.

Another object is to provide a utility cart having a dual set of wheels which may selectively support the cart.

Other objects will be apparent from the following description.

BRIEF DESCRIPTION OF THE DRAWINGS

FIG. 1 is a perspective view of the cart showing its auxiliary wheels in a raised or retracted position.

FIG. 2 is a perspective view of the cart showing the auxiliary wheels in their lowered, cart-supporting position.

FIG. 3 is a rear view of the cart showing the auxiliary wheels in their raised or retracted position.

FIG. 4 is a side view of the cart with parts shown in section and the auxiliary wheels retracted.

FIG. 5 is a side view of the cart with parts shown in section and the auxiliary wheels in their lowered cart-supporting position.

FIG. 6 is a fragmentary side view illustrating the auxiliary wheels in retracted position.

FIG. 7 is a fragmentary side view illustrating the auxiliary wheels in operative lowered position.

DESCRIPTION OF THE PREFERRED EMBODIMENTS

The preferred embodiment illustrated is not intended to be exhaustive or to limit the invention to the precise form disclosed. It is chosen and described to explain the principles of the invention and its application and practical use to thereby enable others skilled in the art to utilize the invention.

The manual utility cart 10 includes a frame portion 12 having a generally inverted U shape and spaced substantially vertical members 14. Frame members 14 may be strengthened and rigidified by a cross-member 16. Cart 10 also includes a second portion 18 spaced from frame portion 12 and also having a generally inverted U shape. Carrier portion 18 has vertical members 20 generally aligned with frame portion vertical members 14 and joined thereto by lower cart frame members 22 which have upwardly extending members 23. Members 14 and 20 are connected to the vertical members 23 by bolts 25, or similar fastening devices, and preferably may be disconnected therefrom for storage or shipping. Lower cart frame members 22 are rigidified by cross frame members 24 spaced above the lower part of frame member 22 and connected at their ends to opposite vertical members 23.

The cross frame members 24 journal an axle 26 passing laterally therethrough. The ends of axle 26 journal wheels 28 which provide rolling support for cart 10. A second or auxiliary set of wheels 30 is journaled on an axle 32 parallel to and spaced from axle 26. Axle 32 is carried by a pair of arms 34 which are fixedly connected to the axle 26 and are of a length to permit the positioning of wheels 30 at a lower level than wheels 28 in the adjustment shown in FIGS. 2 and 5. A spring 36 is connected in tension between each end of axle 32 and cross-frame member 24 and serves to normally urge axle 32 and wheels 30 to retracted position. An arm 38 is fixedly connected at one end to axle 26 at an angle to arms 34. A link 40 is connected at one end to the arm 38 spaced from axle 26 and extends upwardly to and is connected at its upper end to a lever 42 which is pivotally connected to frame cross-member 16 to swing between stops 43 on member 16. A cover 44 is connected between vertical members 23 and cross frame members 24 to support cargo placed in the cart between frame portions 12 and 18 and above wheels 28 and 30.

In the use of cart 10, wheels 30 are normally retracted and clear of any ground contact in the position shown in FIGS. 1, 3, and 4 and are so positioned by springs 36, so that wheels 28 provide rolling support for the cart. When contact of wheels 28 with a surface is no desired, such as when the cart is brought into a building after traversing outdoor terrain, wheels 30 may be shifted into their lowered cart-supporting position shown in FIGS. 2 and 5. This is accomplished by pivoting lever 42 from the FIG. 1 position to the FIG. 2 position between brackets 43, thereby lifting link 40 and connected arm 38 to rotate axle 26 and swing the wheels 30 into ground or building floor contact rearwardly and lower than axle 26. This lifts wheels 28 from frame supporting position and transfers the weight of cart 10 and its load to wheels 30. The connection of link 40 to lever 42 is such that when wheels 30 are shifted to their cart-supporting position, the link 40 and lever 42 are locked into a bracket 43 and any movement of wheels 30 toward their retracted position merely increases the locking engagement of lever 42 and bracket 43. A stop 46 may be attached to axle 26 to bear against frame members 24 to correctly position wheels 30 in their lower cart support position.

It is to be understood that the invention is not to be limited by the terms of the above description but may be modified within the scope of the appended claims.

What I claim is:

1. A manual utility cart comprising a rigid cargo carrying frame, an axle journaled at the lower end of said frame and journaling a first set of wheels to project below said frame, means for mounting a second set of wheels for pivotal movement about said axle between a position lower than said first wheels and a raised position on said frame, and means for rotating said axle and shifting said second set of wheels relative to said frist wheels and said frame betwen said lowered and raised positions, at least one set of wheels supporting a part of said frame at all times.

2. The manual utility cart of claim 1, and a cargo supporting cover carried by said frame and positioned above said axle and said wheels.

3. A manual utility cart comprising a substantially U-shaped rigid frame having spaced fore and aft cargo retaining sections and a lower portion therebetween, a first axle journaled in the frame adjacent the lower rear portion of the frame, a first set of wheels journaled on said axle to project below said lower frame portion, means secured to said first axle and mounting a second axle spaced from and parallel to said first axle, a second set of wheels journaled on said second axle, resilient means normally maintaining said second said second wheels in a position above the lower portion of said frame, and means for rotating said axle and lowering said second wheels to a position lower than said first wheels.

4. The manual utility cart defined in claim 3, wherein said last named means includes a lever piboted to the upper rear portion of said frame between a pair of spaced stops carried by said frame.

5. The manual utility cart defined in claim 4, wherein said last named means includes a link connected to said lever and to an arm projecting laterally from said first axle.

6. The manual utility cart defined in claim 3, and cargo support means carried by said frame spaced above said wheels.

* * * * *